Figure 1:
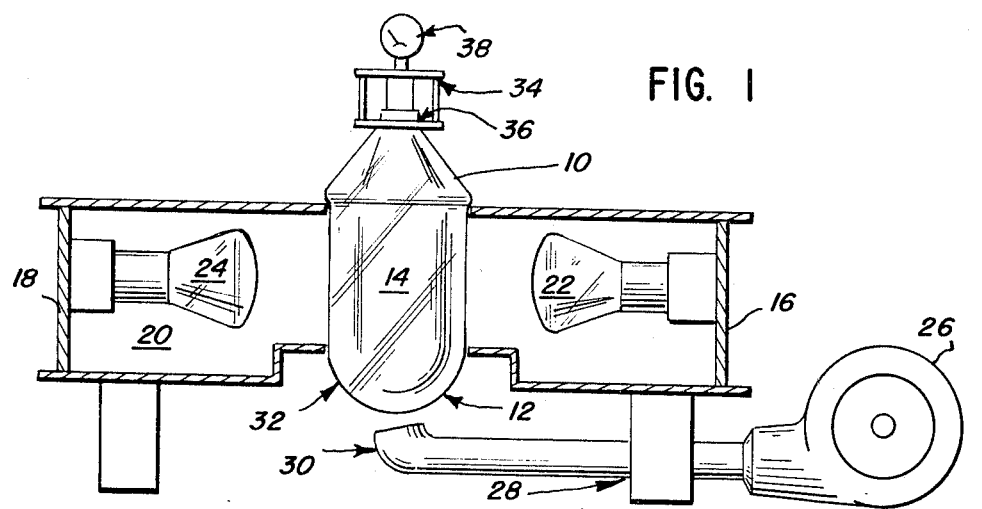

United States Patent [19]

Poppe et al.

[11] 4,260,567
[45] Apr. 7, 1981

[54] SHRINKAGE REDUCTION OF BLOW MOLDED ORIENTED PET BOTTLE

[75] Inventors: Wassily Poppe, Lombard; Charles F. Craddock, Glendale Heights, both of Ill.; Robert W. Gutekunst, Dunwoody, Ga.; Robert G. Ladd, Lisle; Sue A. Mager, Warrenville, both of Ill.

[73] Assignee: Standard Oil Company (Indiana), Chicago, Ill.

[21] Appl. No.: 15,308

[22] Filed: Feb. 26, 1979

[51] Int. Cl.³ .............................. B29C 25/00
[52] U.S. Cl. .............................. 264/25; 215/1 C; 264/85; 264/519; 264/572; 264/235; 264/346; 425/174.4; 425/445
[58] Field of Search .............. 264/25, 519, 520, 521, 264/572, 573, 85, 235, 346; 215/1 C; 428/35; 425/445, 526, 174.4

[56] References Cited

U.S. PATENT DOCUMENTS

| 3,291,877 | 12/1966 | Clement | 264/572 |
|---|---|---|---|
| 3,555,135 | 1/1971 | Paul | 264/235 X |
| 3,849,530 | 11/1974 | Wyeth et al. | 264/235 X |
| 4,025,594 | 5/1977 | Agrawal | 264/346 X |
| 4,039,641 | 8/1977 | Collins | 264/524 X |
| 4,144,298 | 3/1979 | Lee | 425/526 X |
| 4,164,298 | 8/1979 | Nishikawa et al. | 215/1 C |

FOREIGN PATENT DOCUMENTS 2540930  4/1976  Fed. Rep. of Germany .......... 264/538

Primary Examiner—Jan H. Silbaugh
Attorney, Agent, or Firm—Robert R. Cochran; Willim T. McClain; William H. Magidson

[57] ABSTRACT

A process and apparatus for heat setting side walls of biaxially oriented thermoplastic resin containers to reduce shrinkage of the container and container treated by the process. Heating is by infrared radiation while shielding portions of the container. The apparatus comprises container handling systems to provide a fully automated system capable of being incorporated in present container production lines.

9 Claims, 5 Drawing Figures

FIG. 3
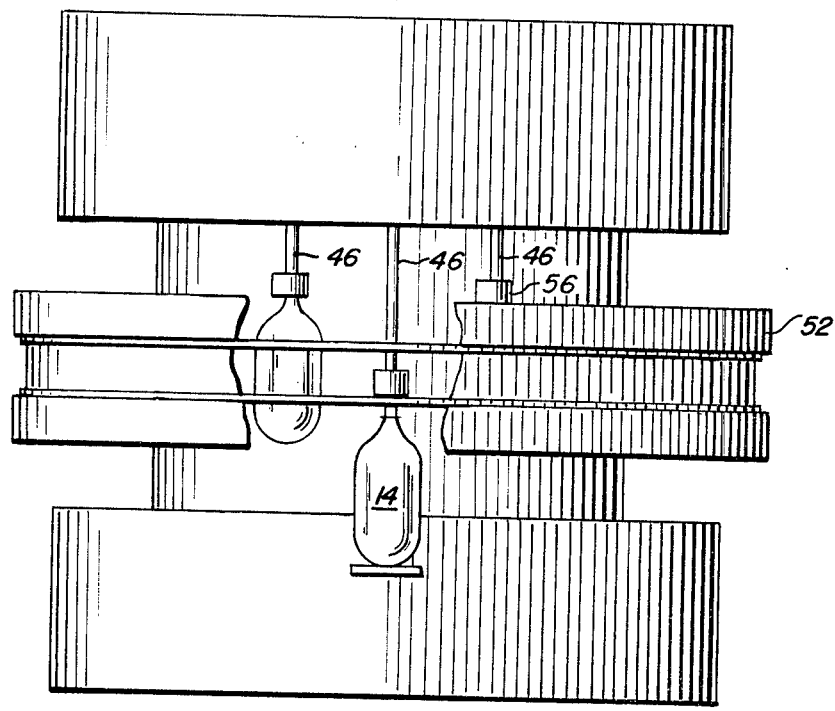
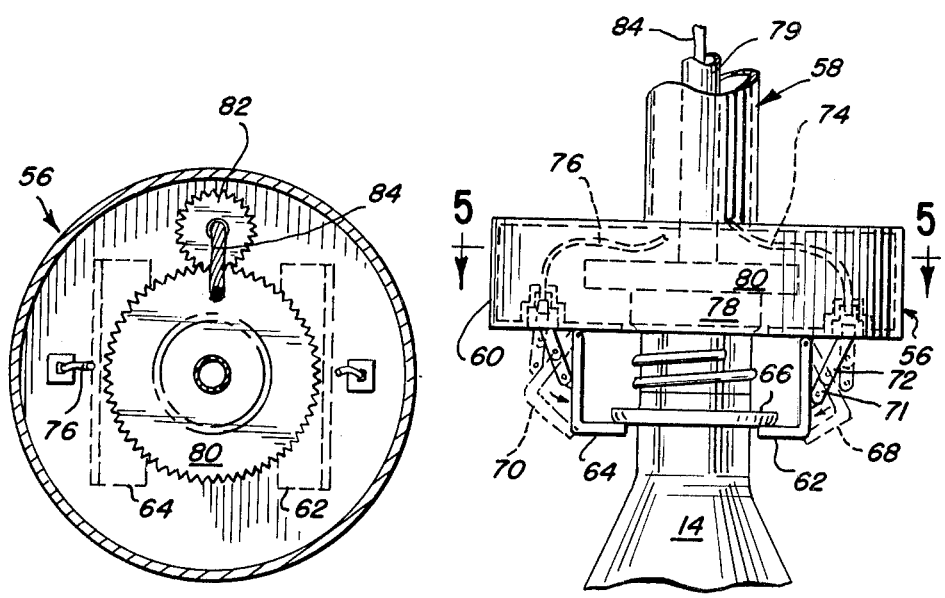
FIG. 5
FIG. 4

SHRINKAGE REDUCTION OF BLOW MOLDED ORIENTED PET BOTTLE

BACKGROUND OF INVENTION

It is well known that plastic material has tendency to creep or shrink when heated and this is especially true of oriented plastic containers such as bottles. With plastic containers this is undesirable because bottles which have shrunk excessively cause trouble in automatic filling systems. Friendship, U.S. Pat. Nos. 3,886,253 (1975) and 3,862,288 (1975) both recognize this problem and have suggested placing formed containers in an oven through which is passed heated air in order to stabilize the volume of the bottles. This treatment, while partially satisfactory, suffers from the fact that the entire bottle is treated. Treatment of the less oriented portions of the bottle is undesirable for many reasons. First, there may be loss of definition of design features, and, further, heating of the less oriented portions may result in a loss of clarity of bottles made of clear thermoplastic materials. Finally, a long treatment time is necessary on the order of one half hour. Another approach to the problem is shown in U.K. Pat. Specification No. 1,474,044 (1977) wherein formed containers are maintained under pressure in the forming zone. The pressure restrains shrinkage while heat setting the product. The treatment time disclosed in the Specification is 25 seconds.

In view of the fact that bottles as disclosed in the Specification are molded in a cycle time of less than six seconds, the additional time for heat setting drastically reduces the production of the molding apparatus.

A study of temperatures reached in the transportation of polyethylene terephthalate bottles during the summer has been made. In preliminary work, a single pallet was placed in a closed, insulated truck which was parked outside. The pallet contained eight, 64-ounce bottles to a box and ten (10) boxes per layer with six (6) layers on the pallet. A shrinkable plastic wrapping surrounded the pallet sides; the bottom was not wrapped and a single layer of corrugated cardboard was placed on top. This is a typical shipping unit. During a three-day experiment in early summer it was determined that maximum temperature reached was 109° F. for the center of the top layer. The maximum outside temperature was 85° F. and a head space temperature of 122° F. was reached. In another run, a fully loaded truck made a trip of over twenty-four (24) hours during the summer and then parked outside in an unshaded area for three additional days. In this test, maximum bottle temperatures varied between 106° F. and 122° F.

One bottle produced by the assignee of this invention has specifications for a sixty-four ounce bottle as shown in the following table:

|  | Target | Minimum | Maximum |
| --- | --- | --- | --- |
| Summer | 1940 cc. | 1912 cc. | 1948 cc. |
| Winter | 1940 cc. | 1923 cc. | 1948 cc. |

Note:
Summer defined as calendar months with average temperatures 60° F. and above.
Winter defined as calendar months with average temperatures below 60° F.

This means that in summer specifications concerning volume variations from a 1940 cc. volume are +8 down to −28 cc. and in winter +8 cc. down to −17 cc. Our findings have shown that on the average our bottle has a volume of 1930 cc. and at temperatures of 140° F. (relative humidity 10%) for four hours displays a shrinkage of 65 cc.

Work to be disclosed hereafter will show that the untreated bottle exceeds the allowable shrinkage while those treated to the present invention are satisfactory.

SUMMARY OF THE INVENTION

The invention relates to a process of using infrared radiation for heat setting the wall portion of biaxially oriented thermoplastic resin containers. In one aspect, the invention relates to a process for heat setting a biaxially oriented thermoplastic resin container, a container having a shoulder portion, a main wall portion, and a base portion comprising pressuring said container by introducing a gas inert to said resin to a pressure sufficient to prevent container collapse, exposing said main wall portion to infrared radiation while shielding said shoulder and base portions from said radiation for a time sufficient for said main wall portion surface to reach a temperature of 1° to 10° F. below the glass transition temperature of the resin, maintaining sufficient gas flow to said shoulder and base portions so that the temperature thereof does not rise above 60° F. below the glass transition temperature of the resin, thereafter cooling said container until said wall portion attains a temperature at least 25° F. below said glass transition temperature of said resin while maintaining said pressure, and releasing said pressure.

In another aspect, the invention relates to an apparatus for heat setting selected portions of an oriented crystalline resin container comprising means to supply pressurized gas to said container, means to supply infrared radiation to selected portions of said container, and means to cool at least some portions of said container not exposed to said radiation.

Finally, the bottle produced according to this invention is novel. From the above it will be apparent that an object of this invention is to improve the heat stability of a bottle.

A further object of this invention is to provide apparatus for practicing the process as described herein.

Other objects and advantages of our invention will be apparent to those skilled in the art upon reading the specification.

THE DRAWING

Figure 2:
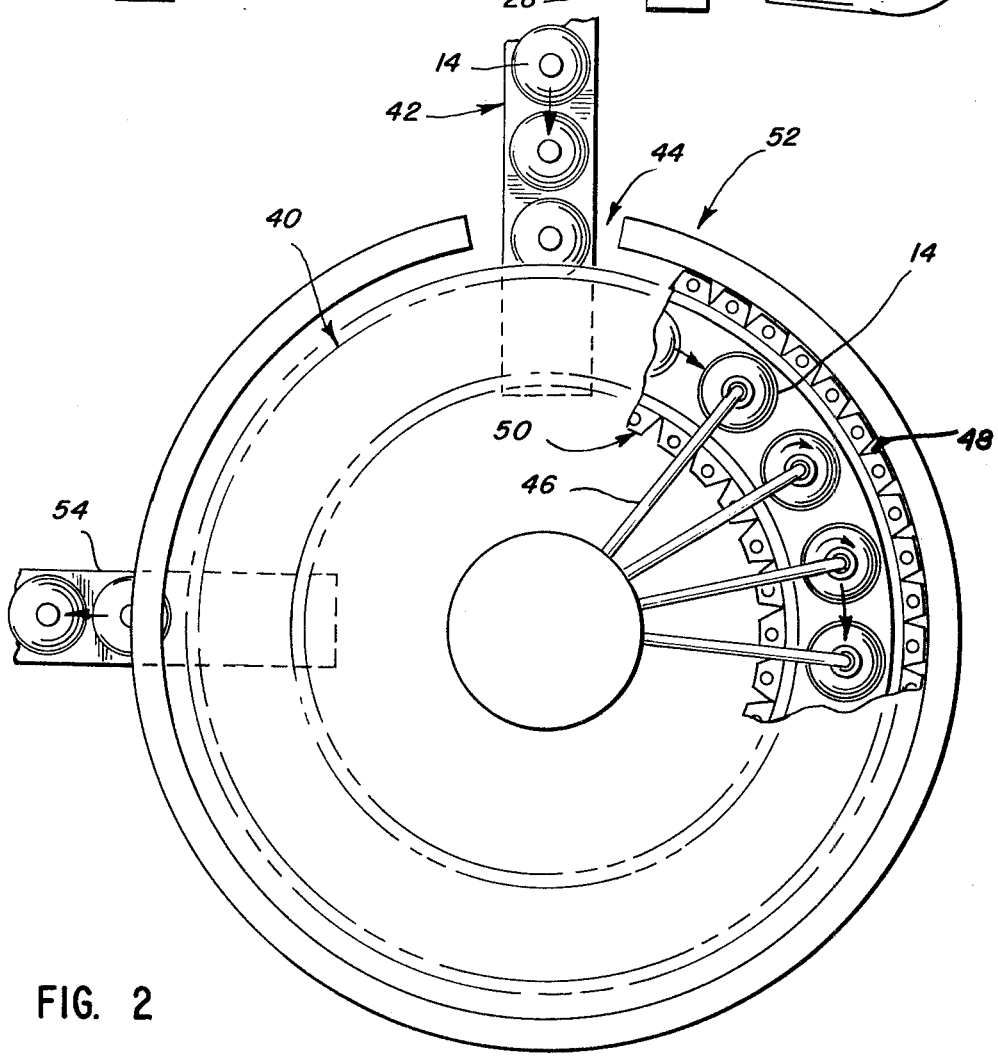

The drawing comprises:

FIG. 1, illustrating, in partial cross-section, apparatus used to demonstrate our invention;

FIG. 2, showing a top elevational view, partially in section, of the apparatus of which the process can be practiced;

FIG. 3, showing, in elevation, a side view of the apparatus of our invention;

FIG. 4, showing, an elevational view of the container gripping means for holding the bottle during passage through the apparatus;

FIG. 5, a cross-section view taken on line 5—5 of FIG. 4.

SPECIFIC EMBODIMENTS

Directing attention to the drawing, FIG. 1 illustrates a simple setup for demonstrating the present invention.

In this figure a closed treating area is provided with top wall 10 and bottom wall 12. These walls define an area of a side wall of bottle 14 to be treated. End walls 16 and 18 enclose opposite sides of the apparatus and front and back walls provide a closed treating chamber 20. Located on side wall 16 and 18 are infrared lamps 22 and 24. Located near the apparatus is a blower 26 connected to tube 28 having end 30 positioned near the lower end 32 of the bottle. A clamp 34 is provided to enclose the upper end 36 of bottle 14. In the work, a pressure gauge 38 was connected to bottle 14.

Apparatus for uses in the commercial practice of this invention is shown in the remaining figures. Drawing attention to FIGS. 2–5, the general construction can be seen. Bottles 14 approach the treatment apparatus 40 along transport system 42, normally supplied from a blowmolding machine (not shown). As these bottles are pushed into the entrance zone 44 of machine 40, they are picked up by arms 46. Each arm 46 performs a number of functions being adapted to pick up the bottle from supply means 42, elevate to a treatment position, supply gas under pressure to the bottle after clamping it in position, rotate the bottle about its axis, and to rotate the bottle through the treatment zone. Around the outer periphery of the apparatus is a series of infrared heating elements 48. A second group of these lamps 50 are positioned around the inner periphery of the zone through which the bottles pass. Heating elements 48 can be individually controlled but, preferably, are controlled in groups such as quadrants. They extend, generally, from one half to two thirds of the circle and energized as needed. Positioned beyond the outer row of infrared heating elements 48 is gas supply means 52. The upper and lower sections of element 52 are positioned to direct cooling air against the upper and lower portions of bottles 14. The number of heating elements can be varied but generally extends around approximately one half of the complete circle shown in FIG. 2. At some point prior to said supply means 42 is a removal area 54. At this point, the bottles are depressurized and released from bottle holding means 56 and can continue through normal processing such as label application and preparation for shipment.

Bottle holding means 56 is more fully shown in FIGS. 4 and 5, to which attention is now directed. Holding means 56 comprises a main shaft 58 connected to a bottle top cover 60. L-shaped members 62 and 64 are adapted to grip the neck ring 66 of the bottle as it approaches the machine 40. In FIG. 4, these are shown in the open position by dotted lines 68 and 70. Toggle members 71 and 72 (on the right-hand side of FIG. 4) operate to move elements 62 and 64 between their open and closed positions. These toggle members are actuated by control cables 74 and 76 which pass through main shaft 58. Obviously, pneumatic or mechanical control of the toggle members can be used. Also provided in bottle holding means 56 is a flexible gasket 78 adapted to provide a gas-tight seal at the open end of bottle 14. Also passing through shaft 58 is a pressure gas conduit 79 which is open to the interior of bottle 14. The gasket 78 is attached to rotatable member 80 to provide for bottle rotation during treatment. Member 80 is driven by gear 82 which is driven by flexible cable 84. The operation of this apparatus will next be described.

In FIG. 1, the bottle is pressurized prior to insertion in the apparatus. Thereafter, it is placed in position and rotated by hand. The fan 26 is actuated to supply cooling air to the bottom of the bottle 14.

The operation of the apparatus as shown in FIGS. 2 through 5 is fully automatic. As the bottles reach the machine they are gripped by members 62 and 64, pressure is supplied, and the bottles are rotated about their axes and through the apparatus. At the end of the heat treatment cycle, full gas flow is provided in order to cool the treated bottle. Treatment conditions can vary depending upon the interrelationship of the amount of heat set desired, the strength of the infrared heating lamps, the wall thickness, the crystallinity of the resin, etc. Suitable lamps for use in the machine 40 are those made by Fostoria Industries designated Model IF 0512H, these being 120 volt, 500 watt lamps. The distance from the heating elements mentioned can vary from 4 to 6 inches. Of course, the distance depends on many factors and will not always be in this range. Such factors include type of resin, treatment time, etc. With other elements, distances as low as one inch have been used.

The present invention will be useful in treating biaxially oriented thermoplastic containers. These can be made of polyolefins such as polypropylene and polyethylene. Other suitable polymers include polyalkylene terephthalates such as polyethylene terephthalate, and polybutylene terephthalate and polyacrylonitrile polystyrene and polyvinyl chloride.

Operation using the apparatus in FIG. 1 is quite simple. The infrared lamps 22 and 24 are energized and blower 26 started. Thereafter pressurized bottle 14 is inserted and rotated for the desired treatment time, after which it is removed, cooled and depressurized.

In the operation of the apparatus shown in FIGS. 2–5, the articles are supplied from the production line. The speed of transmission through apparatus can vary considerably, i.e. from 10 to 50 feet per minute, 12 feet per minute being a common figure with the bottles supplied by means of transport system 42. To insure uniform heating, the bottles are rotated within the holding means 56. This rotation is generally in the range of 2 to 10 revolutions per minute but is limited only by the ability of the machine. Two revolutions per minute has been frequently used. For polyethylene terephthalate the pressure maintained upon the bottles should be within the range of 20 to 30 pounds per square inch with 28 to 30 being optimum to maintain bottle shape. The pressure gas can be anything inert to the resin of the bottle with carbon dioxide, air and nitrogen being preferred.

Since the heating is by infrared radiation, the bottle thickness does not have an appreciable effect upon the treatment. Most beverage bottles currently in production have walls 10 to 12 thousandths of an inch thick. The time of treatment can vary from 2 to 20 seconds.

The bottles should be heated to a temperature just below the glass transition temperature of the resin. For polyethylene terephthalate this heating should be in the range of 160° to 168° F. The shielded portion of the bottles can be cooled with ambient air but this temperature could go to 120° F. without causing any problem. After the bottles have been treated, they continue around the circumference of the machine and are released by the holding mechanism 56 and fed by gravity to removal area 54. Obviously, the pressure should be maintained until the treated portion of the bottle has cooled to well below (approximately 25° F.) the glass transition temperature. For polyethylene terephthalate they should preferably be cooled to not over 140° F.

EXAMPLE I

Twelve 64-ounce polyethylene terephthalate bottles were taken consecutively from a single cavity of a Cincinnati Milicron reheat blowmolding machine and numbered 1 through 12. To establish the affect of infrared radiation upon the resin, the odd numbered bottles were exposed to a heat set treatment comprising a 20-second exposure to an IR oven while maintaining an internal pressure of 29 pounds per square inch. Surface temperature was approximately 168° F. Density of the resin was increased slightly as shown in Table 1.

TABLE 1

| BOTTLE | DENSITY (g./cc.)* |
|---|---|
| 1 (heatset) | 1.364 |
| 2 | 1.360 |
| 3 (heatset) | 1.364 |
| 4 | 1.362 |

*Determined in a toluene/carbon tetrachloride density gradient column.

Bottles 5 through 8 were exposed to air in an atmosphere of 42% relative humidity at 72° F. and the oxygen transfer measured. The results are shown in Table 2 and indicate that the treatment has no significant effect.

TABLE 2

| BOTTLE | O₂ TRANSFER (cc./bottle/day) |
|---|---|
| 5 (heatset) | 0.086 |
| 6 | 0.085 |
| 7 (heatset) | 0.083 |
| 8 | 0.087 |

Tensile strength increases somewhat as a result of the radiation treatment. Portions of the sidewall were tested in an Instron machine (Model 1122) with the jaws moving at a rate of 0.05 inches per minute using an ASTM D1708 microtensile bar, seven specimens being tested on material from each bottle except as indicated.

TABLE 3

| | Tensile yield strength, psi | |
|---|---|---|
| BOTTLE | AXIAL | HOOP |
| 9 (heatset) | 12,550 | 27,510 |
| 10 | 10,840 | 24,980* |
| 11 (heatset) | 12,690 | 27,180 |
| 12 | 10,410* | 24,910 |

*Average of six specimens

Surface temperatures were measured on bottles used in the above tests using Portatemp Digital and Pyro Digital 500 pyrometers with contact at the outside bottle mid-wall. Temperatures obtained over a 25-second exposure are shown below.

TABLE 4

| TIME (Sec.) | TEMP. (°F.) |
|---|---|
| 0 | 76 |
| 5 | 118 |
| 10 | 138 |
| 15 | 153 |
| 20 | 168 |
| 25 | 180 |

EXAMPLE II

Eighteen 64-ounce bottles of polyethylene terephthalate were consecutively taken from a single cavity of the blowmolding machine. The first eight of these were exposed to IR radiation in the apparatus shown in FIG. 1 to treat the wall area below the shoulder to about two inches from the bottle bottom for 20 seconds while employing an internal carbon dioxide pressure of 29 p.s.i. and rotating the bottle by hand at a rate of 2 revolutions per minute. The lamps were Westinghouse 250 watt infrared reflector heat lamps. The distance between the lamps and the bottle was one inch. Volume determinations were made before treatment and on the treated and untreated bottles after treatment, after 4 hours at 140° F. and approximately 8 percent relative humidity, and after cycling between 120° F. and room temperature through 17 cycles with a total of 715 hours in the oven to simulate trailer conditions. Results are tabulated below.

TABLE 5

| | Volume loss, cc | | | |
|---|---|---|---|---|
| Bottle | After Treatment | After 4 Hrs. At 140° F. | After 15½ Hrs. At 120° F. (First Cycle) | After 17 Cycles At 120° C. |
| 1* | 1.6 | 43.7 | | |
| 2* | 5.0 | 39.6 | | |
| 3* | 1.9 | 40.9 | | |
| 4* | 3.1 | | 16.4 | 30.2 |
| 5* | 3.0 | | 17.2 | 31.4 |
| 6* | 2.5 | | 14.2 | 29.7 |
| 7* | 2.4 | | 14.5 | 29.7 |
| 8* | −0.5 | | 15.5 | 30.0 |
| 9 | | 57.4 | | |
| 10 | | 58.3 | | |
| 11 | | 56.0 | | |
| 12 | | 56.7 | | |
| 13 | | 54.5 | | |
| 14 | | | 18.6 | 40.3 |
| 15 | | | 17.5 | 39.8 |
| 16 | | | 18.7 | 41.0 |
| 17 | | | 24.1 | 41.7 |
| 18 | | | 22.2 | 42.7 |

*Heatset

Reasonable variations and modifications of the teachings of this invention will be readily apparent to those skilled in the art.

We claim:

1. A process for heat setting a biaxially oriented thermoplastic resin container, said container having a shoulder portion, a main wall portion, and a base portion comprising pressuring said container by introducing a gas inert to said resin to a pressure sufficient to prevent container collapse during subsequent heat treatment, exposing said main wall portion to infrared radiation while shielding said shoulder and base portions from said radiation for a time sufficient for said main wall portion surface to reach a temperature of 1° to 10° F. below the glass transition temperature of the resin, maintaining sufficient gas flow to said shoulder and base portions so that the temperature of said portions does not rise above 60° F. below the glass transition temperature of the resin during said exposing step, thereafter cooling said container until said wall portion attains a temperature of at least 25° F. below said glass transition temperature of said resin while maintaining said pressure, and releasing said pressure.

2. The process of claim 1 wherein said container is rotated at a speed of at least 2 RPM while exposed to said radiation.

3. The process of claim 2 wherein said speed is 2 to 10 RPM.

4. The process of claim 1 wherein said inert gas is carbon dioxide.

5. The process of claim 1 wherein said resin is polypropylene.

6. The process of claim 1 wherein said resin is polyalkylene terephthalate.

7. The process of claim 1 wherein said resin is polyethylene terephthalate.

8. The process of claim 7 wherein said pressure is 20 to 30 p.s.i.

9. The process of claim 7 wherein said pressure is in the range of 28 to 30 p.s.i., said time is sufficient for said side wall to reach a temperature above 160° F. but below 168° F., and said cooling is to a temperature below 140° F.

* * * * *